United States Patent
Watanabe (10) Patent No.: US 8,792,014 B2
(45) Date of Patent: Jul. 29, 2014

(54) IMAGE PROCESSING APPARATUS AND IMAGE PICKUP APPARATUS

(75) Inventor: Takeshi Watanabe, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 214 days.

(21) Appl. No.: 13/537,176

(22) Filed: Jun. 29, 2012

(65) Prior Publication Data

US 2013/0010158 A1 Jan. 10, 2013

(30) Foreign Application Priority Data

Jul. 4, 2011 (JP) ................................. 2011-148164

(51) Int. Cl.
*H04N 5/228* (2006.01)
*G06K 9/36* (2006.01)
*G06K 9/40* (2006.01)

(52) U.S. Cl.
USPC .......................... 348/222.1; 382/254; 382/280

(58) Field of Classification Search
CPC ........... H04N 5/23229; H04N 5/23232; G06T 5/001; G06T 5/002
USPC ............... 348/222.1; 382/254–255, 260–262, 382/265, 276, 280
See application file for complete search history.

(56) References Cited

U.S. PATENT DOCUMENTS

| | | | |
|---|---|---|---|
| 2008/0007797 A1* | 1/2008 | Hayashi et al. | 358/474 |
| 2008/0043126 A1* | 2/2008 | Hayashi | 348/294 |
| 2008/0080019 A1* | 4/2008 | Hayashi et al. | 358/474 |
| 2010/0013966 A1* | 1/2010 | Feng et al. | 348/273 |
| 2011/0285879 A1* | 11/2011 | Hatakeyama | 348/241 |
| 2011/0292257 A1* | 12/2011 | Hatakeyama | 348/242 |

FOREIGN PATENT DOCUMENTS

| | | |
|---|---|---|
| JP | 2003132351 A | 5/2003 |
| JP | 2005308490 A | 11/2005 |

* cited by examiner

*Primary Examiner* — Kelly L Jerabek
(74) *Attorney, Agent, or Firm* — Rossi, Kimms & McDowell LLP (57) ABSTRACT

An image processing apparatus includes a memory configured to store information of an OTF or a PSF of an optical system for at least one of capturing conditions, and an image processor configured to generate secondary and higher components of a phase of an OTF or a shape component of a PSF corresponding to a capturing condition of a captured image through an interpolation based on at least two OTFs or PSF in the memory, while center-of-gravity positions or maximum intensity positions are accorded with each other or differential root-mean-square values of the point spread functions are minimum, and to restore the image utilizing the generated OTF or an OTF derived from the generated PSF.

16 Claims, 4 Drawing Sheets

IMAGE PROCESSING APPARATUS AND IMAGE PICKUP APPARATUS

BACKGROUND OF THE INVENTION

1. Field of the Invention

The present invention relates to an image processing apparatus and an image pickup apparatus, which restore an (deteriorated) image that has been deteriorated by an aberration of an image pickup system, to an (original) image or pre-deterioration image.

2. Description of the Related Art

One conventionally known technology is to restore an image deteriorated by an aberration of an optical system (referred to as "image restoration processing" hereinafter). One image restoration processing a method for using information of an optical transfer function ("OTF") or a point spread function ("PSF") of an optical system which has a Fourier transform relationship with the OTF.

The OTF has a real part and an imaginary part, and is generally stored as two-dimensional data in storage, such as a memory. This two-dimensional data will be referred to as "OTF data" hereinafter. In the general image restoration processing, OTF data is prepared for each RGB, and the OTF data for one image height is a tap number in the x direction×a tap number in the y direction×2 (real part, imaginary part)×3 (chromatic components). The OTF and PSF are different according to capturing conditions, such as an image height of an image captured via the optical system, and a focal length, an F-value, and an object distance of the optical system.

Japanese Patent Laid-Open No. ("JP") 2005-308490 proposes a method for interpolating an optical characteristic of glasses having an arbitrary object distance, and JP 2003-132351 assumes an elliptical PSF, and a method for generating a PSF through an interpolation according to an image height position.

The above methods of storing OTF data for each chromatic component and for at least one of capturing conditions cause a data amount to be enormous. Accordingly, this inventor attempts to store discrete OTF data corresponding to representative capturing conditions in an image processing apparatus (or image pickup apparatus), and to generate OTF data corresponding to remaining capturing conditions through an interpolation utilizing stored OTF data. At this time, there is a trade-off relationship between a reduced data amount of the OTF data and the interpolation accuracy (image restoring precision).

However, when PSF or OTF data are interpolated while the center-of-gravity positions of the PSFs used for the interpolation are discarded with each other (or primary components of the phases of the OTFs are discarded with each other), the interpolation cannot be highly precise. Prior art is silent about a solution for this problem.

SUMMARY OF THE INVENTION

The present invention provides an image processing apparatus and an image pickup apparatus, which can restrain OTF data capacity to be stored, and perform a highly precise image restoration.

Although the above conventional problem discusses the OTF, the PSF has a Fourier transform relationship with the OTF and thus the same problem occurs when the PSF data is stored and used for the image restoration processing.

An image processing apparatus or an image pickup apparatus according to the present invention includes a memory configured to store information of an optical transfer function or a point spread function of an image pickup optical system for at least one of capturing conditions, and an image processor configured to generate secondary and higher components of a phase of an optical transfer function or a shape component of a point spread function corresponding to a capturing condition of an image captured through the image pickup optical system through an interpolation based on at least two optical transfer functions or point spread functions which correspond to different capturing conditions and are derived from the information stored in the memory, while center-of-gravity positions or maximum intensity positions are accorded with each other or differential root-mean-square values of the point spread functions are minimum, and to restore the image utilizing an optical transfer function derived from the optical transfer function that has been generated through the interpolation or an optical transfer function derived from the point spread function that has been generated through the interpolation.

Further features of the present invention will become apparent from the following description of exemplary embodiments with reference to the attached drawings.

DESCRIPTION OF THE EMBODIMENTS

In the image restoration, the following expression is established where (x, y) is a real space, f(x, y) is an original image before it is deteriorated by an optical system, h(x, y) is a PSF, and g(x, y) is a deteriorated image.

$$g(x,y)=\iint f(X,Y)\cdot h(x-X,y-Y)dXdY \quad (1)$$

The following expression is established by Fourier-transforming Expression (1) to convert the real space (x, y) into the frequency space (u, v) where F(u, v) is a Fourier transform of f(x, y), G(u, v) is a Fourier transform of g(x, y), and H(u, v) is a Fourier transform of h(x, y) and an optical transfer function ("OTF"):

$$G(u,v)=F(u,v)\cdot H(u,v) \quad (2)$$

The following expression is established from Expressions (1) and (2):

$$F(u,v)=G(u,v)/H(u,v) \quad (3)$$

Therefore, F(u, v) can be obtained by dividing the Fourier transform G(u, v) by H(u, v) in the frequency space, and the original image f(x, y) can be obtained by inverse-Fourier-transforming F(u, v).

Since the above processing actually amplifies noise, it is known that the following Wiener filter may be used for 1/H(u, v) in Expression 3 where $\Gamma$ is a constant used to reduce an amplification amount of the noise:

$$1/H(u,v)=1/H(u,v)\cdot |H(u,v)|^2/(|H(u,v)|^2+\Gamma) \quad (4)$$

Multiplying the OTF having a frequency and phase information of the optical system by Expression (4) can make zero a phase of the PSF caused by the diffraction and aberration of the optical system, amplifies the frequency characteristic of the amplitude, and provide a highly precise and well restored image.

Although it is thus necessary to obtain precise OTF information of the image pickup optical system, an optical performance, such as an F-value and aberration, of the image pickup optical system used for a camera generally significantly fluctuates among image heights. In order to correct the deterioration of the object image, Expression (4) cannot be used for batch calculating in the frequency space as it is, and Expression (4) is converted into an (image restoring) filter in the real space for each image height.

In the image restoration utilizing the image restoring filter, it is necessary to store the image restoring filter or the OTF information for producing the image restoring filter in the apparatus. When information of the image restoring filter is stored in the image pickup apparatus, the calculation used to correct the deterioration of the image is only filtering processing, and the processing becomes faster. However, a change of the image restoring filter becomes impossible, and it is difficult to control the level of the deteriorated correction.

On the other hand, if the OTF information used to produce the image restring filter is stored, the level of the deteriorated correction can be freely controlled in accordance with the deterioration degree of the object image. The image restoring filter can be generated by Fourier-transforming the OTF information.

The OTF is two-dimensional data having a real part and an imaginary part. In the general image restoration, the wavelength is expressed by variables of three chromatic components of RGB, and thus the OTF data of one image height is expressed by a tap number in the x direction×a tap number in the y direction×2 (real part, imaginary part)×3 (chromatic components). In addition, the OTF is different according to a capturing condition, such as an image height, a focal length, an F-value, and an object distance. Therefore, storing the OTF data for each chromatic component and for at least one of capturing conditions causes a data amount to be impractically enormous.

Accordingly, discrete OTF data corresponding to representative capturing conditions are stored in the image processing apparatus (or image pickup apparatus), and OTF data corresponding to remaining capturing conditions are generated through an interpolation utilizing the stored OTF data. At this time, there is a trade-off relationship between a reduced data amount of the OTF data and the interpolation accuracy (image restoring precision).

With respect to an absolute amount of the aberration in the general image pickup optical system, a positional shift amount of an image point for each wavelength caused by the lateral chromatic aberration among the wavelengths is larger than the spread of the PSF and becomes particularly remarkable at an off-axis object point. This corresponds to a primary component of the phase of the OTF. The phase component of the OTF is a tan(Im(OTF)/Re(OTF)) and the primary component will be referred to as a primary phase.

However, the center-of-gravity position of the PSF (point image) differs according to the capturing condition even for the same wavelength. For example, when a PSF at a target position that is located between a first position, such as (0, a), and a second position, such as (0, b), in the XY coordinate system is generated by performing a linear interpolation utilizing the PSF that has a center-of-gravity position at the first position, and the PSF that has a center-of-gravity position at the second position, a shape of the interpolated PSF destroys.

Accordingly, in highly precisely interpolating the shape of the PSF, this embodiment accords (aligns or matches) two center-of-gravity positions (for example, by moving them to the origin) and interpolates the shape through weighting according to these two center-of-gravity positions. In other words, the primary component of the phase of the OTF which represents the center-of-gravity position of the PSF is eliminated in the frequency space, and uses secondary and higher components for the interpolation.

First Embodiment

Figure 1A:
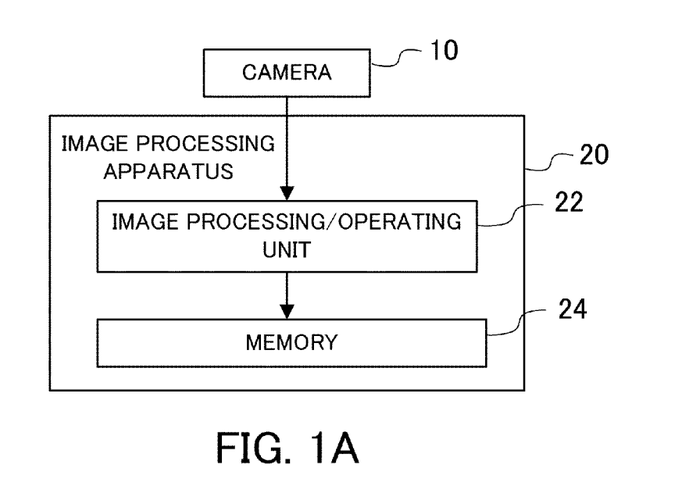
FIG. 1A is a block diagram of an image processing apparatus and FIG. 1B is a flowchart of image restoration processing according to a first embodiment.
Figure 1B:
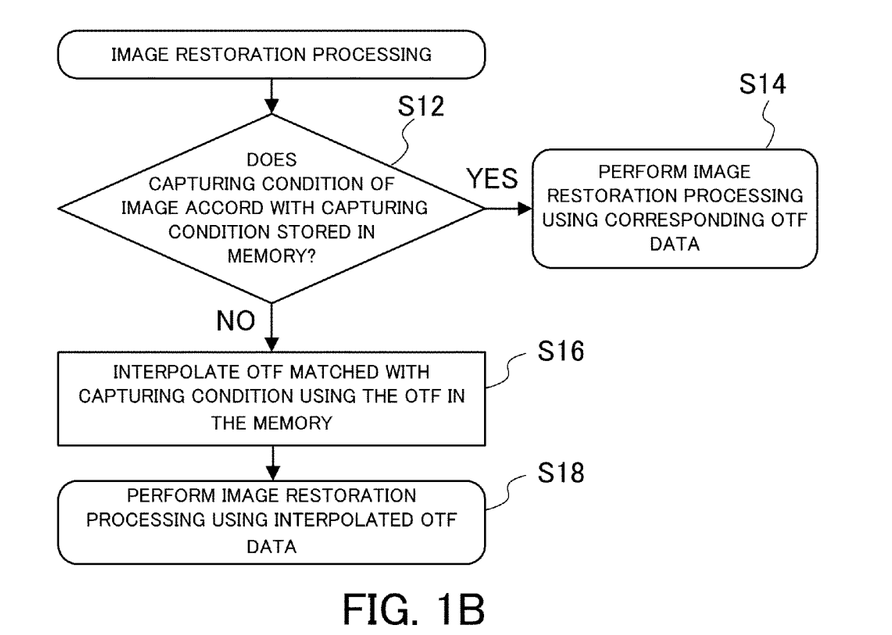

FIG. 1A is a block diagram of the image processing apparatus 20 according to a first embodiment. FIG. 1B is a flowchart of image restoration processing executed by the image processing apparatus 20 according to the first embodiment, and "S" stands for the step. An image processing method (image processing program) illustrated in FIG. 1B acts to instruct a computer to serve each step.

The image processing apparatus 20 is a separate unit from a camera (image pickup apparatus) 10 in FIG. 1A, but may be integrated with the camera 10 as described later. The camera 10 generates an object image (deteriorated image) that has been deteriorated by an aberration of an image pickup optical system. The object image is generated as a result of that an image pickup element photoelectrically converts an optical image captured by the image pickup optical system.

The image processing apparatus 20 includes an image processing/operating unit 22 and a memory 24, and may include a computer and software (image processing program) installed in the computer.

The image processing/operating unit 22 is an image processor configured to provide image processing including image restoration processing, and includes a microcomputer (processor). The image processing/operating unit 22 can restore an image by utilizing information of the optical transfer function ("OTF") or the point spread function ("PSF") stored in the memory 24.

The memory 24 stores a program that contains image processing including image restoration processing, and information of the OTF or PSF of the image pickup optical system of the camera, for at least one of capturing conditions, such as an image height, a focal length, an F-value, and an object distance. This embodiment allows a capturing condition other than a combination of the image height, the focal length, the F-value, and the object distance. Since the memory 24 merely stores the information of the OTF or PSF for a part of the combination of the capturing conditions, the storage capacity can be reduced.

According to this embodiment, the information of the OTF (OTF data) or the PSF stored in the memory 24 is information of secondary and higher components from which a primary component of the phase of the OTF is eliminated or information of a shape component from which a center-of-gravity position component of the PSF is eliminated. However, the OTF or PSF information stored in the memory 24 may contain the primary component of the phase of the OTF or the center-of-gravity of the PSF. In this case, the image processing/operating unit 22 uses this information to generate pre-interpolation information of the secondary and higher components from which a primary component of the phase of the OTF is eliminated or information of a shape component from which a center-of-gravity position component of the PSF is eliminated.

Figure 2A:
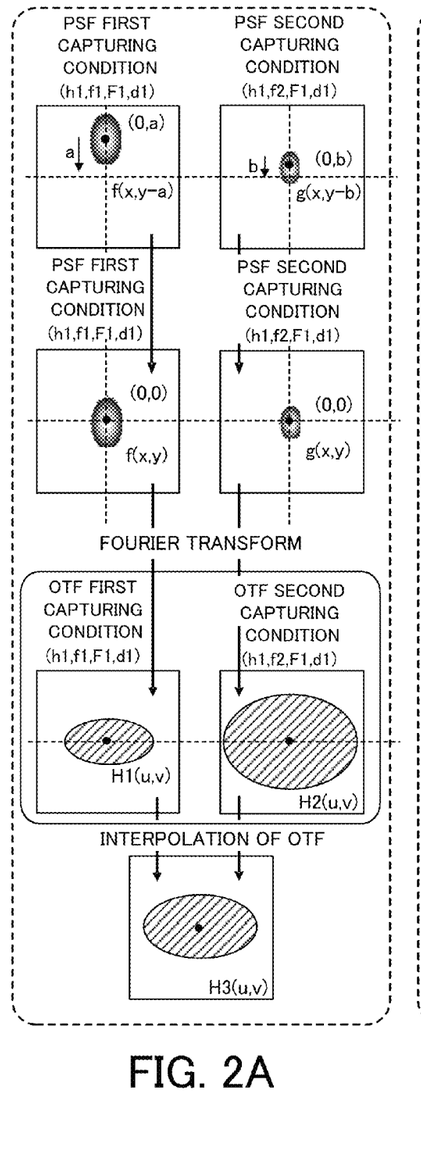
FIGS. 2A and 2B are views for explaining a production example of data stored in a memory illustrated in FIG. 1A according to the first embodiment.
Figure 2B:
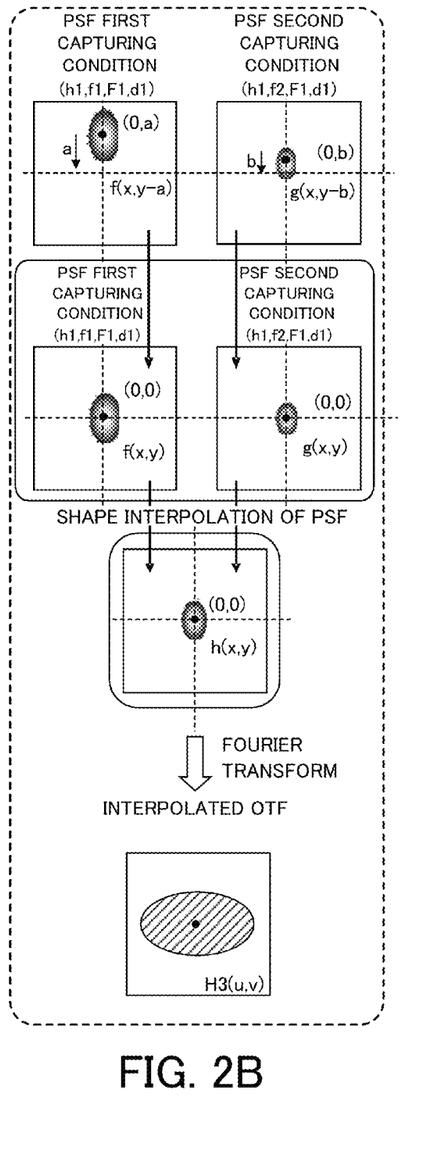

FIGS. 2A and 2B are views for explaining a production example of the data stored in the memory 24. The OTF is a frequency response of the PSF calculated by the Fourier transform of the PSF, and the PSF and the OTF possess equivalent information. A method of obtaining the PSF may include calculating a wavefront aberration of the optical system, generating a pupil function, Fourier-transforming the pupil function, and squaring the resultant absolute value.

The way of selecting the reference wavelength and the reference spherical surface is arbitrary in calculating the wavefront aberration. For example, the acquired PSF is different between the calculation around the ideal image height determined by the paraxial magnification of the optical system and the calculation around a terminus of the principal ray obtained through ray tracing of the actual optical system.

According to the former calculation, the PSF contains a distortion component of the reference wavelength, and thus the entire PSF shifts by the distortion amount. According to the latter calculation, the PSF contains no distortion component of the reference wavelength, and the PSF does not shift.

This embodiment may arbitrarily sets the center of the reference spherical surface when the PSF is calculated, but if the center of the reference spherical surface is not set to the terminus of the principal ray, the generated distortion component of the reference wavelength is eliminated for the calculated wavelength after the PSF is calculated.

A description will be given of a generation of the PSF through an interpolation which has an intermediate focal length in one illustrative zooming optical system, when only the focal length is different between the two PSFs. The PSF interpolations between the image heights, between the F-values, and between the object distances may utilize similar approaches.

The PSF used for the interpolation may correspond to a single wavelength but may correspond to a plurality of wavelengths when the wavelengths are weighted according to the spectrum intensity distribution of the arbitrary light source and added up.

Initially, the image processing/operating unit 22 selects a PSF corresponding to a first capturing condition (h1, f1, F1, d1) and a PSF corresponding to a second capturing condition (h1, f2, F1, d1) as two different PSF data used for the interpolation. In the meanwhile, it is sufficient that at least two PSFs or OTFs corresponding to different capturing conditions are used for the interpolation. The generated PSF data through the interpolation is set to a PSF corresponding to a capturing condition (hi, fj, Fk, dl) which has an image height hi, a focal length fj, an F-value Fk, and an object distance dl.

The lateral chromatic aberration component is different between the PSFs corresponding to different capturing conditions like the PSF of the first capturing condition (h1, f1, F1, d1) and the PSF corresponding to a second capturing condition (h1, f2, F1, d1). Assume that f(x, y−a) denotes the PSF corresponding to the first capturing condition (h1, f1, F1, d1) and g(x, y−b) denotes the PSF corresponding to the second capturing condition (h1, f2, F1, d1). Then, the center-of-gravity position of each PSF shifts in the y direction by "a" and "b" due to the lateral chromatic aberration component. The XY coordinate accords with the xy coordinate of h(x, y) that is the PSF described with Expression (1).

Thus, the image processing/operating unit 22 moves the maximum intensity positions or center-of-gravity positions of two PSFs to the coordinate origin, and accords the center-of-gravity positions of the two PSFs with each other. When the center-of-gravity positions of the PSFs are accorded with one another, the primary components of the phases of the OTFs are made approximately equal.

Next, the image processing/operating unit 22 Fourier-transforms the PSF so as to converts it into the OTF, and stores it in the memory 24. The number of OTFs corresponds to the number of capturing conditions. As enclosed by solid lines in FIG. 2A, H1(u, v) denotes the OFT corresponding to the first capturing condition, and H2(u, v) denotes the OFT corresponding to the second capturing condition. These OTFs are stored in the memory 24.

In obtaining H3(u, v) that is an OTF corresponding to the capturing condition (h1, f3, F1, d1) of the image, the OTF corresponding to the first capturing condition (h1, f1, F1, d1) and the OTF corresponding to the second capturing condition (h1, f2, F1, d1) are obtained from the memory 24 and weighted and added up.

For example, at an image height having a relationship of h1<h2<h3, OTFs having image heights of h1 and h3 may be interpolated and an OTF having an image height of h2 may be generated. When a focal length in zooming has a relationship of f1≤f2≤f3, OTFs having focal lengths of f1 and f3 may be interpolated and an OTF having a focal length of f2 may be generated. In a diaphragm state having an F-value relationship of F1≤F2≤F3, OTFs having diaphragm states of F1 and F3 may be interpolated and an OTF having a diaphragm state of F2 may be generated. In an object distance of d1≤d2≤d3, OTFs having object distances of d1 and d3 may be interpolated and an OTF having an object distance of d2 may be generated.

As illustrated in FIG. 2B, the memory 24 stores PSF data in which the maximum intensity position or center-of-gravity position of the PSF shifts to the origin position, and may be used for the above processing. In other words, in FIG. 2B, two PSFs (f(x, y) and g(x, y)) each enclosed by a solid line is stored in the memory 24. A shift amount of the PSF may be determined so that the RMS value of the PSF may be minimized for each chromatic component.

For example, at an image height having a relationship of h1<h2<h3, PSFs having image heights of h1 and h3 may be interpolated and a PSF having an image height of h2 may be generated. When a focal length in zooming has a relationship of f1≤f2≤f3, PSFs having focal lengths of f1 and f3 may be interpolated and a PSF having a focal length of f2 may be generated. In a diaphragm state having an F-value relationship of F1≤F2≤F3, PSFs having diaphragm states of F1 and F3 may be interpolated and a PSF having a diaphragm state of F2 may be generated. In an object distance of d1≤d2≤d3, PSFs having object distances of d1 and d3 may be interpolated and a PSF having an object distance of d2 may be generated.

This is because an interpolation using the PSF is equivalent with an interpolation using the OTF. One example is illustrated below:

$$h(x, y) = \frac{(f3 - f2) \cdot f(x, y) + (f2 - f1) \cdot g(x, y)}{(f2 - f1) + (f3 - f2)} \quad (5)$$

$$OTF(\mu, v) = \mathfrak{J}\{h(x, y)\} = \frac{(f3 - f2) \cdot \mathfrak{J}\{f(x, y)\} + (f2 - f1) \cdot \mathfrak{J}\{g(x, y)\}}{(f2 - f1) + (f3 - f2)}$$

In the meanwhile, h(x, y) denotes a PSF corresponding to an image pickup position (h1, f2, F1, d1) after the interpolation is provided, and OTF(u, v) denotes that OTF.

It may be shifted so that the maximum intensity position of the PSFs corresponding to the first capturing condition (h1, f1, F1, d1) and the second capturing condition (h1, f2, F1, d1) or the root mean square ("RMS") value can be minimum. Alternatively, it may be accorded with a position other than the origin.

After the image restoration processing starts, the image processing/operating unit 22 determines whether the capturing condition of the captured image accords with one of the capturing conditions stored in the memory 24 (S12). If so (Yes of S12), the image processing/operating unit 22 produces an image restoring filter using the corresponding OTF data, and performs image restoration (S14).

On the other hand, when the OTF corresponding to the capturing condition is not stored in the memory 24 (No of S12), the OTFs stored in the memory 24 are interpolated and an OTF is generated (S16), and the image is restored with the generated OTF.

Figure 3A:
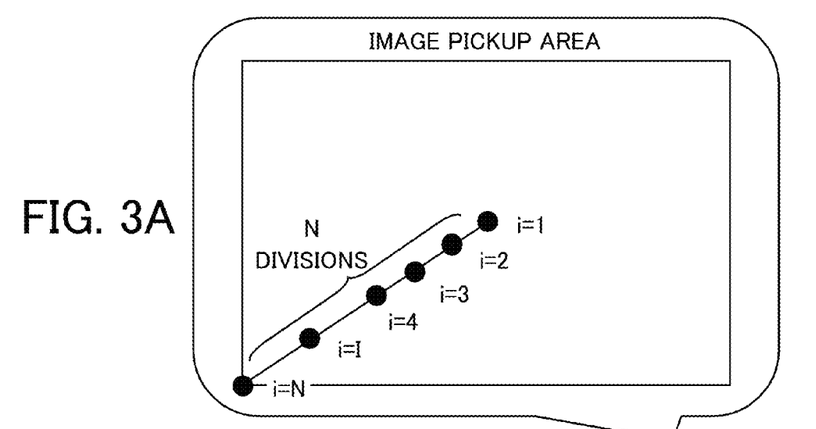
FIGS. 3A and 3B are views for explaining S16 illustrated in FIG. 1B according to the first embodiment.

FIG. 3 is a view for explaining details of S16. Initially, as illustrated in FIG. 3A, the image pickup area is divided into N segments from the axial image height to the outermost off-axis image height, and OTFs are stored with the capturing conditions. For a region that has no OTF or capturing condition, two OTFs corresponding to two image height positions closest to a target position are weighted according to a distance and interpolated, and an OTF corresponding to the target position is generated.

Since the OTF of the image pickup optical system differs according to the capturing condition, an OTF corresponding to a capturing condition of capturing the object is generated through the interpolation based on data of discretely existing, actual OTFs and capturing conditions. For example, the capturing condition may contain a focal length f of 20 mm, an F-value of 2.8, an object distance d of ∞, etc.

For simplicity, a description will be given of processing at an I-th image height position. As illustrated by black dots in FIG. 3B, an actual capturing condition is located at a lattice point in a three-dimensional space with variables of a focal length, an F-value, and an object distance. A capturing condition with which corresponding OTF data actually exists on the three-dimensional space is illustrated by a black dot. A capturing condition (hI, fJ, FK, dL) under which an image is captured may be abbreviated by (I, j, k, l)=(I, J, K, L).

Figure 3B:
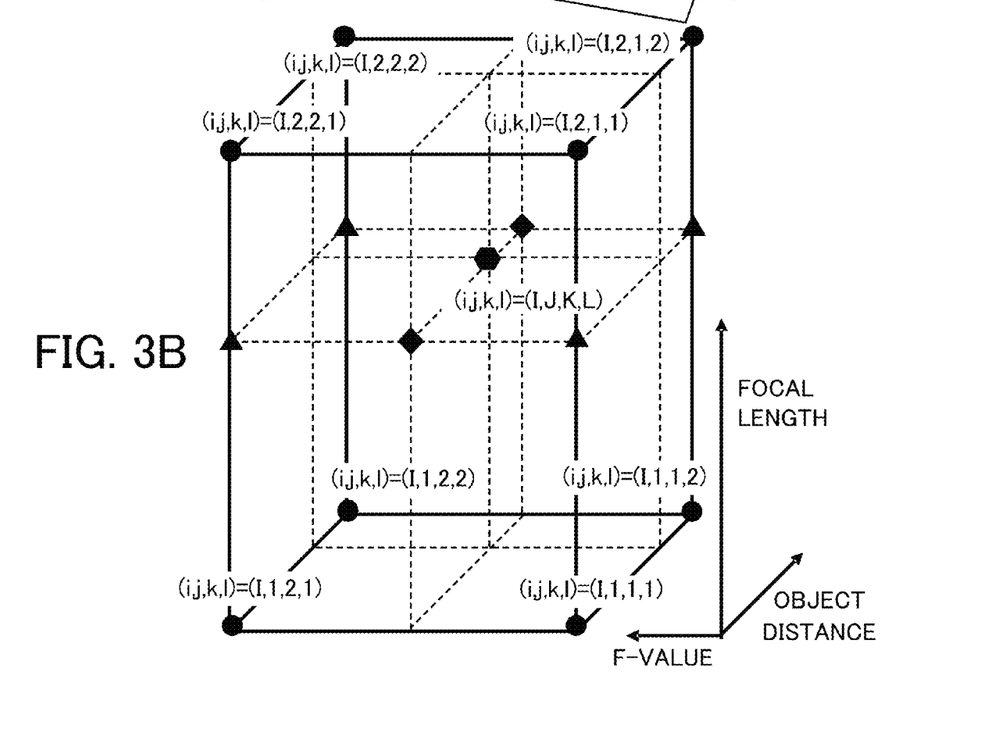

Initially, eight actual capturing conditions illustrated by black dots in FIG. 3B are obtained: (i, j, k, l)=(I, 1, 1, 1), (I, 2, 1, 1), (I, 1, 1, 2), (I, 2, 1, 2), (I, 1, 2, 1), (I, 2, 2, 1), (I, 1, 2, 2), (I, 2, 2, 2). Corresponding OTFs are also acquired.

Next, as illustrated by black triangles in FIG. 3B, four first interpolation capturing conditions are prepared: An OTF corresponding to (I, J, 1, 1) is generated based on the two OTFs corresponding to (I, 1, 1, 1) and (I, 2, 1, 1). An OTF corresponding to (I, J, 1, 2) is generated based on the two OTFs corresponding to (I, 1, 1, 2) and (I, 2, 1, 2). An OTF corresponding to (I, J, 2, 1) is generated based on the two OTFs corresponding to (I, 1, 2, 1) and (I, 2, 2, 1). An OTF corresponding to (I, J, 2, 2) is generated based on the two OTFs corresponding to (I, 1, 2, 2) and (I, 2, 2, 2).

Next, as illustrated by black rhombs in FIG. 3B, two second interpolation capturing conditions are prepared from the four first interpolation capturing condition: An OTF corresponding to (I, J, K, 1) is generated based on the two OTFs corresponding to (I, J, 1, 1) and (I, J, 2, 1), and an OTF corresponding to (I, J, K, 2) is generated based on the two OTFs corresponding to (I, J, 1, 2) and (I, J, 2, 2).

Next, an OTF corresponding to a capturing condition (I, J, K, L) is generated based on the two OTFs corresponding to the two second interpolation capturing conditions (I, J, K, 1) and (I, J, K, 2). This embodiment thus provides interpolations by commonly using three variables among the image height, the focal length, the F-value, and the object distance.

The above example provides interpolations of the OTF data in order of the focal length, the F-value, and the object distance, but the polarization order is not particularly limited to this order. While this embodiment provides interpolation processing utilizing linear weighting, but a bi-cubic interpolation using a trigonometric function, or another type of interpolation may be used.

A similar approach may be used to obtain the OTF by interpolating the PSF in the real space area, and by performing a frequency conversion.

The image restoration processing in S14 and S18 use H3(u, v) of the interpolated OTF for H(u, v) of Expressions (3) and (4). At this time, the interpolated OTF has no primary component in the phase, and cannot restore the deterioration caused by the lateral chromatic aberration and the distortion among the aberrations of the image pickup optical system. However, a deterioration caused by another aberrational component may be restored.

Accordingly, another embodiment restores an image by adding the primary component of the phase of the OTF to an OTF generated through an interpolation or an OTF generated by Fourier-transforming a PSF generated through an interpolation. Alternatively, as in S14 and S18 in this embodiment, the image processing/operating unit 22 restores an image utilizing an OTF generated through an interpolation (which has no primary component in the phase) or an OTF made by Fourier-transforming a PSF generated through an interpolation. Separate from the image restoration processing illustrated in FIG. 1B, known processing may be performed for the restored image so as to reduce the lateral chromatic aberration or the distortion.

In FIG. 2A, the two PSFs are Fourier-transformed to generate the OTFs while the center-of-gravity positions of the PSFs are accorded with each other, and an OTF is interpolated by interpolating the secondary and higher components of that phase. In addition, in FIG. 2B, while the center-of-gravity positions of the two PSFs are accorded with each other, a phase component of the PSF corresponding to a capturing condition of an image is obtained through the interpolation, and then the secondary and higher components of the phase of the corresponding OTF is generated through the Fourier transform.

The present invention is not limited to the embodiment illustrated in FIGS. 2A and 2B. For example, the image processing/operating unit 22 Fourier-transforms the two PSFs, while their center-of-gravity positions are not accorded with each other. Then, the image processing/operating unit 22 eliminates the primary component of the phase from each of the two OTFs generated through the Fourier transforms, and generates secondary and higher components of the phase an OTF corresponding to the capturing condition of the image.

As described above, the image processing/operating unit 22 may generate the OTF or PSF through the interpolation for each chromatic component of the RGB.

Second Embodiment

Figure 4:
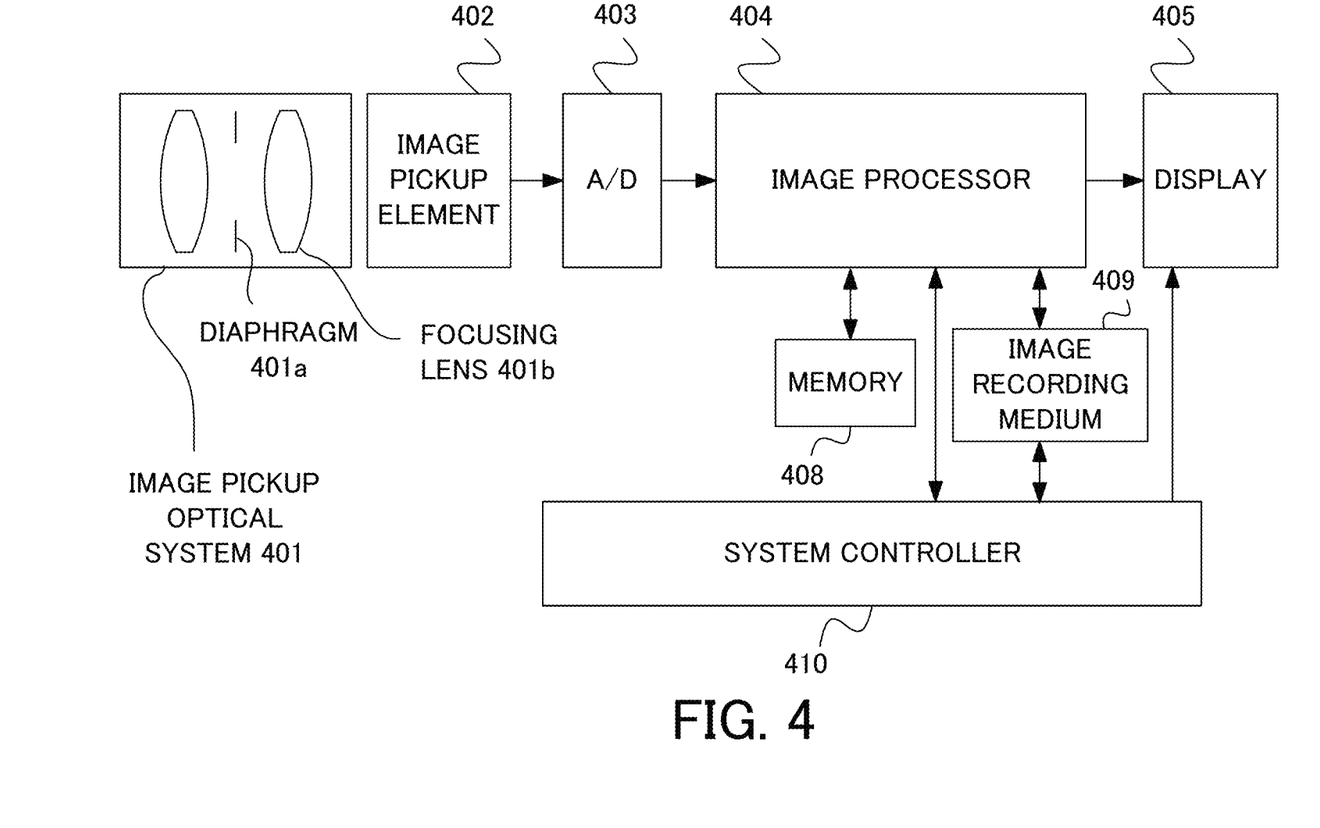
FIG. 4 is a block diagram of a digital camera according to a second embodiment.

FIG. 4 is a block diagram of a digital camera (image pickup apparatus) according to a second embodiment. The digital camera includes an image pickup optical system 401 that includes a diaphragm 401a and a focusing lens 401b and forms an optical image of an object. An image pickup element 402 is configured to photoelectrically convert the optical image into an analogue electric signal. An A/D converter 403 converts the analogue electric signal into a digital signal, and an image processor 404 performs various image processing for the digital signal.

The various image processing contains the above image restoration processing. In other words, according to this embodiment, the image processing apparatus is incorporated as an image processor 404 into the camera. In this case, discrete OTF data (or PSF data) is stored in a memory 408. An image that has experienced various processing containing image restoring is displayed on a display 405, or recorded in an image recording medium 409. Each component in the camera is controlled by a system controller 410.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-148164, filed Jul. 4, 2011 which is hereby incorporated by reference herein in its entirety.

What is claimed is:

1. An image processing apparatus comprising:
a memory configured to store information of an optical transfer function or a point spread function of an image pickup optical system for at least one of capturing conditions; and
an image processor configured:
to generate secondary and higher components of a phase of an optical transfer function or a shape component of a point spread function corresponding to a capturing condition of an image captured through the image pickup optical system through an interpolation based on at least two optical transfer functions or point spread functions which correspond to different capturing conditions and are derived from the information stored in the memory, while center-of-gravity positions or maximum intensity positions are accorded with each other or differential root-mean-square values of the point spread functions are minimum, and
to restore the image utilizing an optical transfer function derived from the optical transfer function that has been generated through the interpolation or an optical transfer function derived from the point spread function that has been generated through the interpolation.

2. The image processing apparatus according to claim 1, wherein the information stored in the memory is information of secondary and higher components from which a primary component is eliminated in the phase of the optical transfer function or the shape component of the point spread function from which a center-of-gravity position component is eliminated.

3. The image processing apparatus according to claim 1, wherein the information stored in the memory contains a primary component of the phase of the optical transfer function or a center-of-gravity position component of the point spread function, and
wherein the image processor utilizes the information stored in the memory to generate pre-interpolation information of the secondary and higher components from which the primary component is eliminated in the phase of the optical transfer function or the shape component from which a center-of-gravity component of the point spread function is eliminated, and performs the interpolation utilizing the pre-interpolation information.

4. The image processing apparatus according to claim 1, wherein the image processor restores the image by adding a primary component of the phase of the optical transfer function to the optical transfer function generated through the interpolation or the optical transfer function derived through a Fourier transform to the point spread function generated through the interpolation.

5. The image processing apparatus according to claim 1, wherein the image processor restores the image utilizing the optical transfer function generated through the interpolation or the optical transfer function derived through a Fourier transform to the point spread function generated through the interpolation, and performs processing for reducing a lateral chromatic aberration or a distortion for a restored image.

6. The image processing apparatus according to claim 1, wherein the image processor Fourier-transforms the two point spread functions corresponding to the different capturing conditions while the center-of-gravity positions of the two point spread functions are accorded with each other, and generates secondary and higher components of the phase of the optical transfer function corresponding to the capturing condition of the image by interpolating the secondary and higher components of the phase of the two optical transfer functions generated through Fourier-transforming.

7. The image processing apparatus according to claim 1, wherein the image processor obtains the shape component of the point spread function through the interpolation corresponding to the capturing condition of the image while center-of-gravity positions of two point spread functions corresponding to the different capturing condition are accorded with each other, and then generates secondary and higher components of the phase of the optical transfer function corresponding to the capturing condition of the image through Fourier-transforming.

8. The image processing apparatus according to claim 1, wherein the image processor generates the optical transfer function or the point spread function through the interpolation for each chromatic component of RGB.

9. The image processing apparatus according to claim 1, wherein at an image height having a relationship of $h1<h2<h3$, the different capturing conditions include image heights of h1 and h3, and the capturing condition of the image has an image height of h2.

10. The image processing apparatus according to claim 1, wherein when a focal length in zooming has a relationship of $f1 \leq f2 \leq f3$, the different capturing conditions include focal lengths of f1 and f3, and the capturing condition of the image has a focal length of f2.

11. The image processing apparatus according to claim 1, wherein in a diaphragm state having a relationship of $F1 \leq F2 \leq F3$, the different capturing conditions include diaphragm states of F1 and F3, and the capturing condition of the image has a diaphragm state of F2.

12. The image processing apparatus according to claim 1, wherein in an object distance of $d1 \leq d2 \leq d3$, the different capturing conditions include object distances of d1 and d3, and the capturing condition of the image has an object distance of d2.

13. The image processing apparatus according to claim 1, wherein the capturing conditions include an image height, a focal length, an F-value, and an object distance.

14. An image processing apparatus comprising:
a memory configured to store information of an optical transfer function or a point spread function of an image pickup optical system for at least one of capturing conditions; and
an image processor configured:
  to Fourier-transform two point spread functions corresponding to different capturing conditions while center-of-gravity positions of the two point spread functions are not accorded with each other,
  to eliminate primary components of the phases from two optical transfer functions that are formed by Fourier-transforming the two point spread functions,
  to generate secondary and higher components of a phase of an optical transfer function corresponding to a capturing condition of an image captured through the image pickup optical system by interpolating the two optical transfer functions, and
  to restore the image utilizing the optical transfer function corresponding to the capturing condition.

15. An image pickup apparatus comprising:
a memory configured to store information of an optical transfer function or a point spread function of an image pickup optical system for at least one of capturing conditions; and
an image processor configured:
  to generate secondary and higher components of a phase of an optical transfer function or a shape component of a point spread function corresponding to a capturing condition of an image captured through the image pickup optical system through an interpolation based on at least two optical transfer functions or point spread functions which correspond to different capturing conditions and are derived from the information stored in the memory, while center-of-gravity positions or maximum intensity positions are accorded with each other or differential root-mean-square values of the point spread functions are minimum, and
  to restore the image utilizing an optical transfer function derived from the optical transfer function that has been generated through the interpolation or an optical transfer function derived from the point spread function that has been generated through the interpolation.

16. A non-transitory computer-readable storage medium storing a process for causing an information processing apparatus to execute a method comprising the steps of:
  storing, in a memory, information of an optical transfer function or a point spread function of an image pickup optical system for at least one of capturing conditions;
  generating secondary and higher components of a phase of an optical transfer function or a shape component of a point spread function corresponding to a capturing condition of an image captured through the image pickup optical system through an interpolation based on at least two optical transfer functions or point spread functions which correspond to different capturing conditions and are derived from the information stored in the memory, while center-of-gravity positions or maximum intensity positions are accorded with each other or differential root-mean-square values of the point spread functions are minimum; and
  restoring the image utilizing an optical transfer function derived from the optical transfer function that has been generated through the interpolation or an optical transfer function derived from the point spread function that has been generated through the interpolation.

* * * * *